(12) United States Patent
Ziegler et al.

(10) Patent No.: US 6,489,561 B2
(45) Date of Patent: Dec. 3, 2002

(54) BATTERY WIRE LEAD MANAGEMENT

(75) Inventors: William Ziegler, Reading, MA (US); Michael Manganese, Peabody, MA (US)

(73) Assignee: American Power Conversion, West Kingston, RI (US)

( * ) Notice: Subject to any disclaimer, the term of this patent is extended or adjusted under 35 U.S.C. 154(b) by 0 days.

(21) Appl. No.: 09/772,747

(22) Filed: Jan. 30, 2001

(65) Prior Publication Data

US 2002/0100603 A1 Aug. 1, 2002

(51) Int. Cl.[7] .................................................. H02G 3/00
(52) U.S. Cl. ..................... 174/72 A; 174/65 R; 174/135
(58) Field of Search .............................. 174/72 A, 68.1, 174/71 R, 72 C, 65 R, 65 G, 50.6, 96, 135; 138/177, 178

(56) References Cited

U.S. PATENT DOCUMENTS

| | | | | | |
|---|---|---|---|---|---|
| 5,280,966 A | * | 1/1994 | Morris et al. | ................... | 285/89 |
| 5,704,400 A | * | 1/1998 | Eldridge | .................... | 138/96 T |
| 5,945,635 A | * | 8/1999 | Suzuki et al. | .............. | 174/72 A |
| 6,326,546 B1 | * | 12/2001 | Karlsson | ....................... | 174/64 |

* cited by examiner

*Primary Examiner*—Anthony Dinkins
*Assistant Examiner*—W. David Walkenhorst
(74) *Attorney, Agent, or Firm*—Mintz, Levin, Cohn, Ferris, Glovsky and Popeo, P.C.

(57) ABSTRACT

Embodiment of the present invention relates to a wire harness assembly that includes a guide housing and a plurality of battery wires that pass through the guide housing, wherein the guide housing is contained and reciprocates within a tunnel formed on a chassis of an uninterruptible power supply (UPS).

23 Claims, 6 Drawing Sheets

BATTERY WIRE LEAD MANAGEMENT

FIELD OF THE INVENTION

The present invention pertains to methods and apparatus for providing battery wire lead management, and in particular to a wire harness assembly that includes a guide housing that facilitates battery wire lead management.

BACKGROUND OF THE INVENTION

Uninterruptible power supplies (UPS) usually have battery back-up systems that provide for uninterrupted power for sensitive and/or critical loads, such as computer systems and other data processing systems. FIG. 1 shows a typical prior art UPS 100 used to provide regulated uninterrupted power. The UPS 100 includes an input filter/surge protector 102, a transfer switch 104, a controller 106, a battery 108, a battery charger 109, an inverter 120 and a DC-DC converter 123. The UPS also includes an input 124 for coupling to an AC power source and an outlet 126 for coupling to a load.

The UPS 100 operates as follows. The filter/surge protector 102 receives input AC power from the AC power source through the input 124, filters the input AC power and provides filtered AC power to the transfer switch and the battery charger. The transfer switch 104 is configured to receive AC power from the filter/surge protector 102 and also receive AC power from the inverter 120. The controller 106 determines whether the AC power available from the filter/surge protector is within predetermined tolerances, and if so, controls the transfer switch to provide the AC power from the filter/surge protector to the outlet 126. If the AC power from the rectifier is not within the predetermined tolerances, which may occur due to "brown out," "high line," or "black out" conditions or due to power surges, then the controller controls the transfer switch to provide the AC power from the inverter 120. The DC-DC converter 123 is an optional component that converts the output of the battery to a voltage that is compatible with the inverter. Depending on the particular inverter and the battery used the inverter may be operatively coupled to the battery either directly or through a DC-DC converter.

Users typically make a battery connection before the first operation of the UPS and usually after the battery needs replacement. The UPS usually has a battery compartment that the battery fits into. The compartment may have wires with connectors attached to it that protrude from an opening and may be pulled out to receive the battery. Excessive force exerted on the wires may cause the wires to be electrically disconnected from the product. If the battery is connected to the wires with the polarity reversed there is a possibility that damage may result to the UPS. Typically, the user is required to dress the wires or re-insert the wires into the opening as the battery is placed into the compartment to ensure that the wires do not get "pinched" as the compartment cover is closed.

SUMMARY OF THE INVENTION

In one general aspect, the invention features an assembly to provide battery wire lead management in an uninterruptible power supply (UPS) comprising a chassis having a tunnel and a wire harness assembly that includes a guide housing that is contained in the tunnel of the chassis, the guide housing having a body with a cavity that opens at each end of the body to receive at least one battery wire and a plurality of battery wires passing through the cavity of the body of the guide housing. In other aspects, the assembly includes at least one latch located at one end of the body; a stopper located at one end of the body; a portion of the stopper is formed as a handle; wherein the difference in a length of the body of the guide housing and a length of the tunnel determines a reciprocating distance of travel of the guide housing in the tunnel; wherein the chassis has a channel and the guide housing has at least one protrusion formed on the body of the guide housing to facilitate travel of the guide housing through the channel of the chassis; wherein the guide housing is molded onto the wires; wherein the guide housing snaplocks over the wires; wherein the battery wires are immobile within the guide housing; a first connector attached to one end of a first battery wire of the plurality of battery wires and a second connector attached to one end of a second battery wire of the plurality of battery wires; wherein the first and the second connectors are within a substantially immediate vicinity of the guide housing; wherein the guide housing includes the first connector and the second connector; a battery is connected to the first and second connector; and the tunnel is within a vicinity of a battery compartment.

In another general aspect, the invention features an assembly to provide battery wire lead management in a chassis of an uninterruptible power supply (UPS) comprising a wire harness assembly that includes a guide housing having a body with a cavity and having a plurality of battery wires passing through the cavity of the body of the guide housing and means for receiving and allowing the guide housing to reciprocate in the chassis. In other aspects, the assembly includes means for latching onto the receiving means.

In another general aspect, the invention features a method for providing a battery wire lead management in an uninterruptible power supply (UPS) having a chassis comprising providing a wire harness assembly that includes a guide housing having a body with a cavity that opens at each end of the body to receive at least one battery wire and a plurality of battery wires passing through the cavity of the body of the guide housing and forming a tunnel in the chassis, the tunnel being configured to receive the guide housing and allow the guide housing to reciprocate within the tunnel. In other aspects, the method includes latching the guide housing to the tunnel using at least one latch on one end of the body and forming a stopper at an other end of the body of the guide housing; forming a channel in the chassis and forming at least one protrusion on the body of the guide housing to facilitate in the guide housing to travel through the channel of the chassis; molding the guide housing onto the battery wires; providing snaplocks on the guide housing to snaplock the guide housing onto the battery wires; immobilizing the battery wires within the guide housing; attaching a first connector to one end of a first battery wire and attaching a second connector to one end of a second battery wire, wherein the first and the second connectors are within a substantially immediate vicinity of the guide housing; connecting a battery to the first and second connector; and forming a handle on the guide housing that is used as a leverage to connect the battery to at least one of the first and second connectors.

BRIEF DESCRIPTION OF THE FIGURES

For a better understanding of the present invention, reference is made to the drawings which are incorporated herein by reference, and in which.

DETAILED DESCRIPTION OF PREFERRED EMBODIMENTS

Embodiment of the present invention relates to a wire harness assembly that comprises a guide housing and a plurality of battery wires that pass through the guide housing, wherein the guide housing is contained and reciprocates within a tunnel formed on a chassis of an uninterruptible power supply (UPS).

Figure 1:
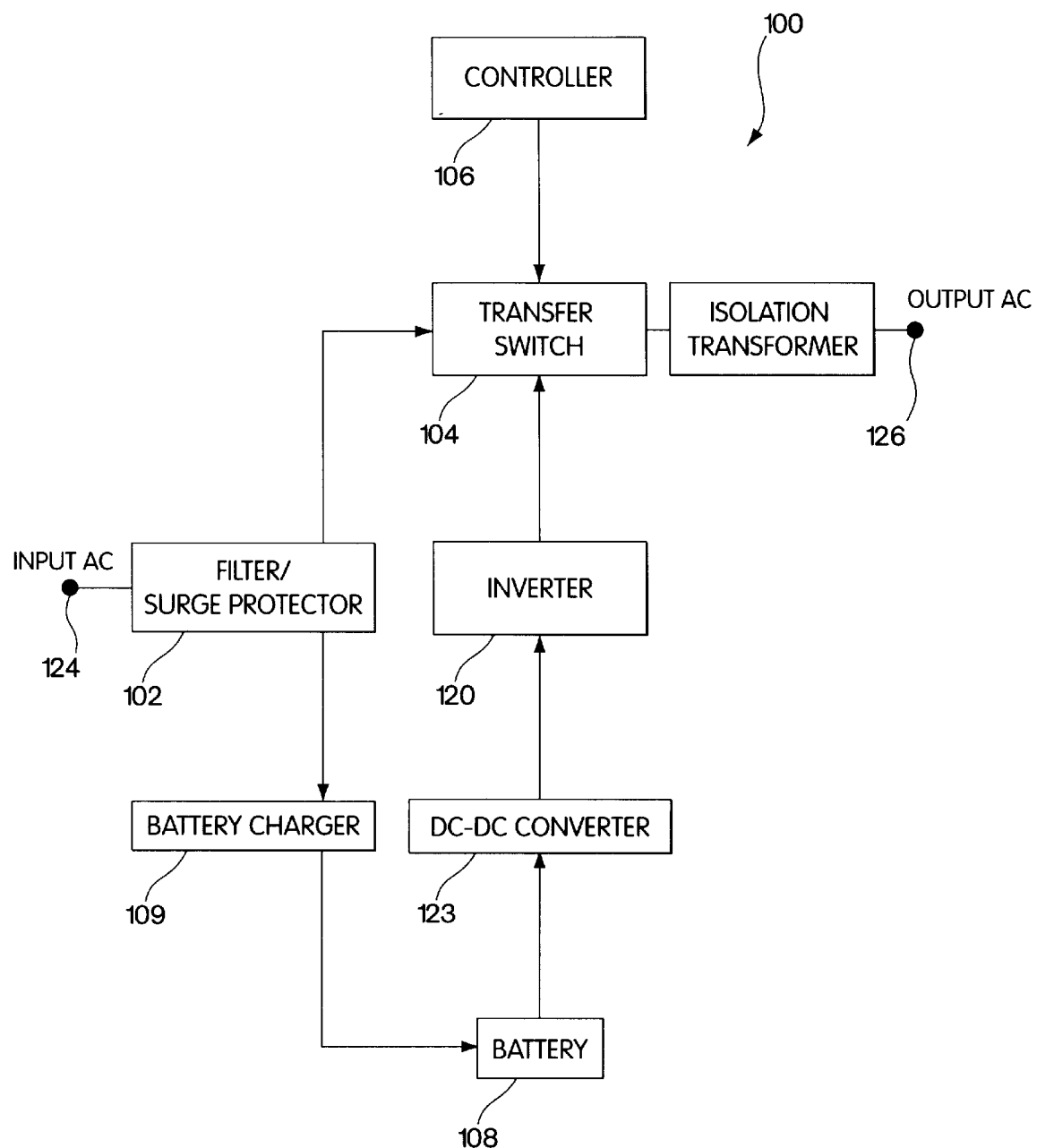
FIG. 1 illustrates a schematic diagram of a conventional uninterruptible power supply (UPS)
Figure 2:
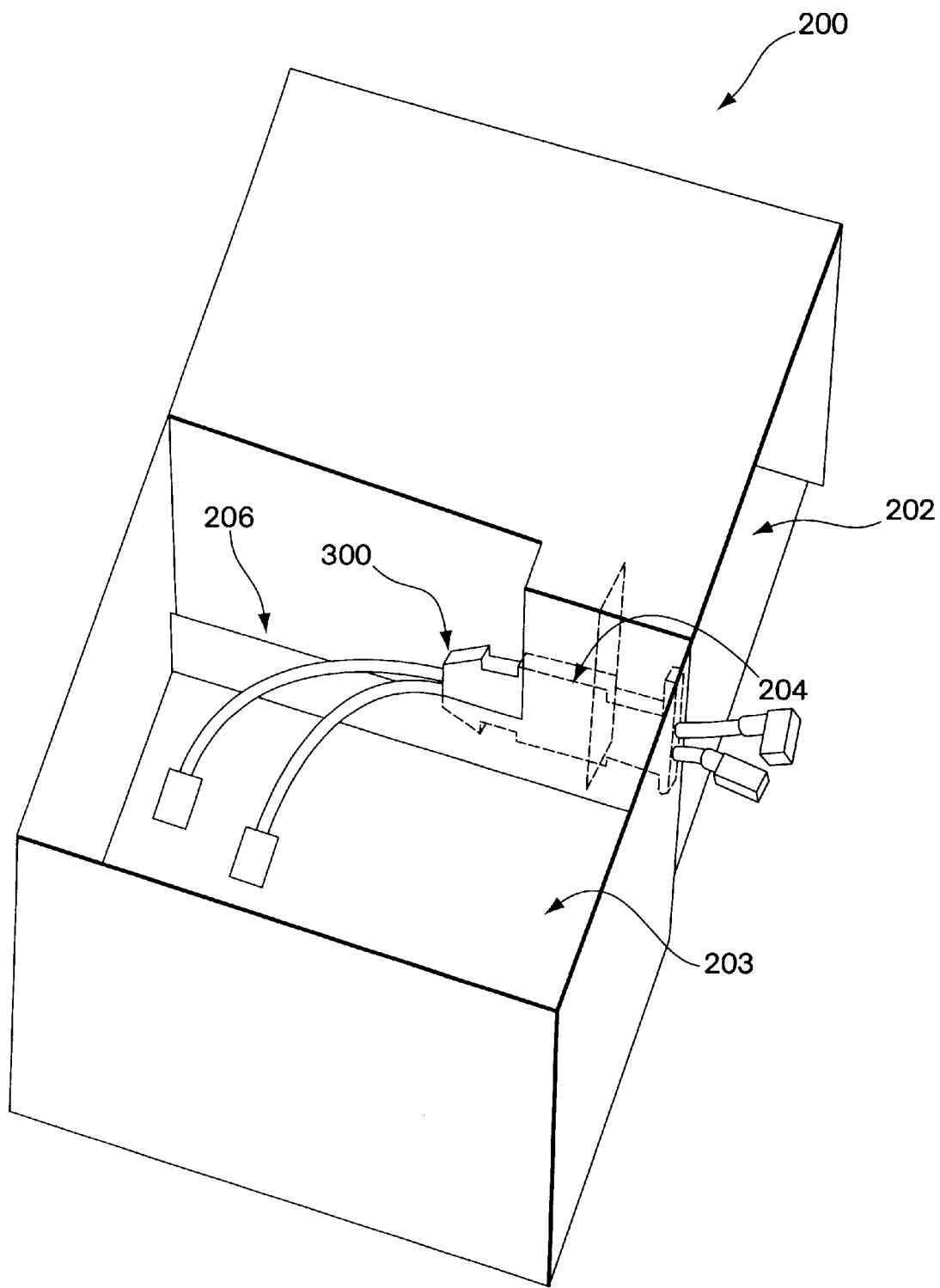
FIG. 2 illustrates a chassis that is configured to receive a guide housing and a wire harness assembly that includes the guide housing in accordance with one embodiment of the present invention.
Figure 3:
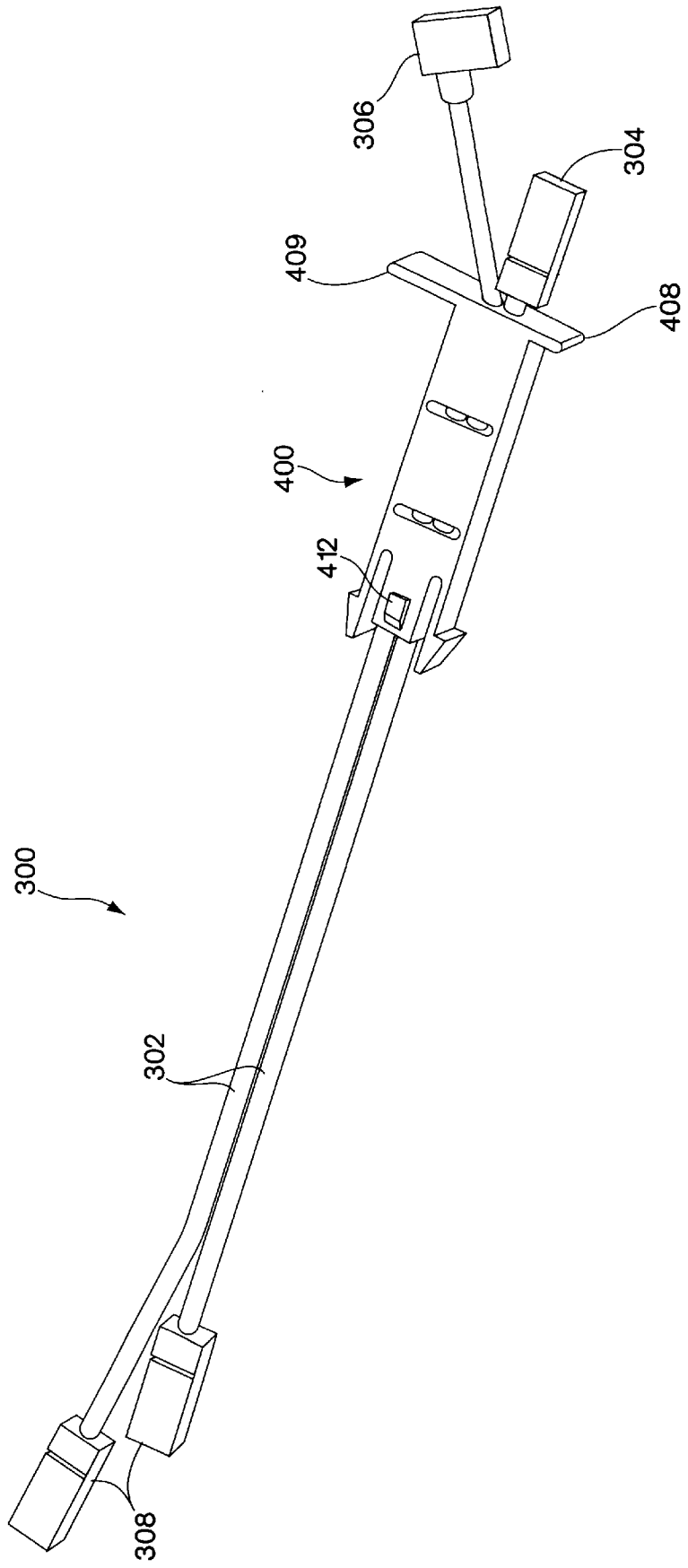
FIG. 3 shows a second view of the wire harness assembly of FIG. 2.
Figure 5:
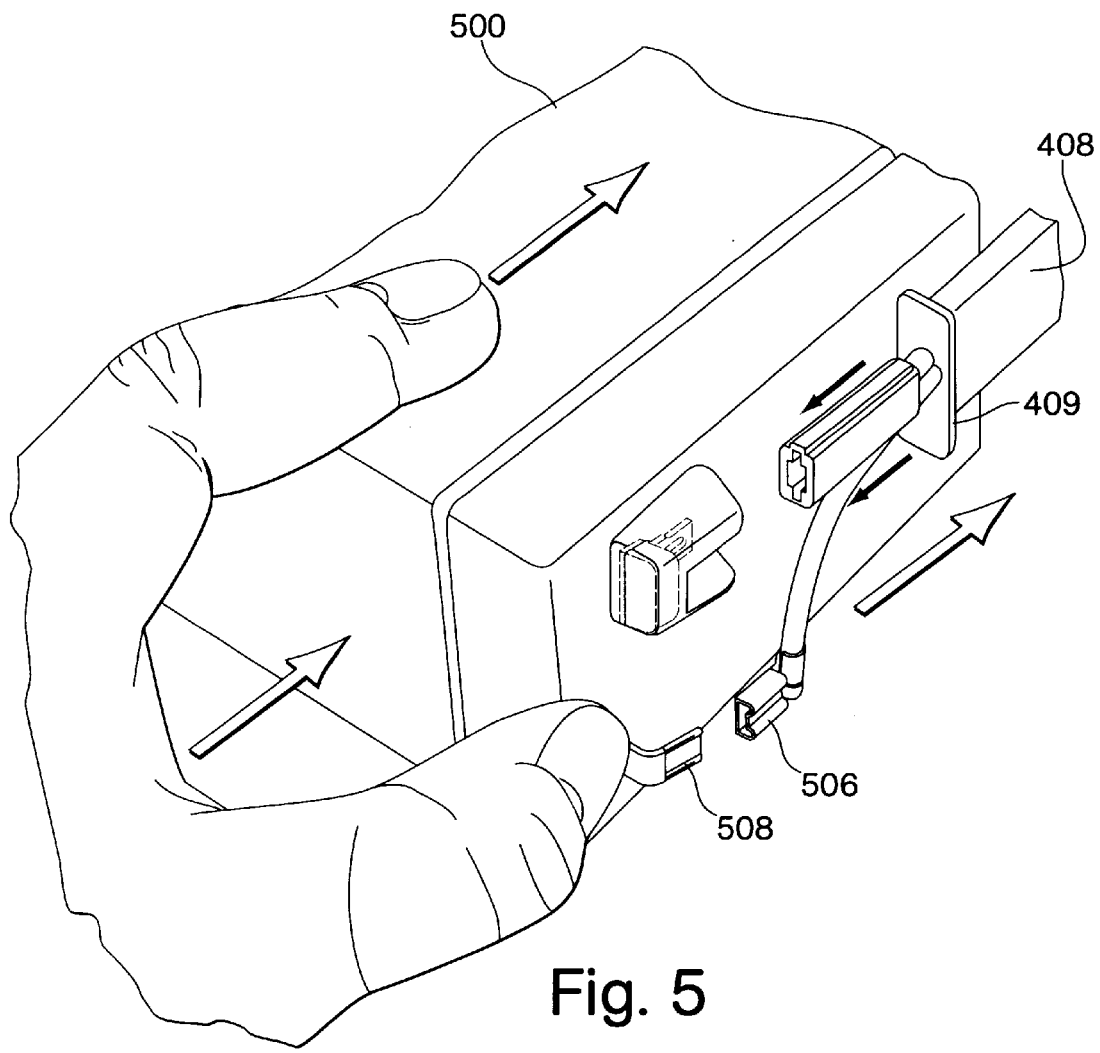
FIG. 5 illustrates insertion of a battery into a battery compartment with the guide housing of FIG. 2 extending out to receive the battery.

FIG. 2 shows a portion of a UPS chassis 200 having a battery compartment 202 that is configured to receive a battery (such as the battery 500 shown in FIG. 5). The chassis 200 further has a UPS compartment 203 that houses electrical circuits (not shown) that form the UPS. A tunnel 204 is formed on the inner surface of the chassis 200 in the vicinity of the battery compartment 202 although it may be formed on any part of the chassis 200 according to a desired result. The tunnel 204 is configured to receive a wire harness assembly 300 that will now be described in detail with reference to FIG. 3.

The wire harness assembly 300 comprises a guide housing 400 and a plurality of battery wires 302 that pass through the guide housing 400. In the embodiment shown, the guide housing 400 immobilizes the wires 302, although in other embodiments, the battery wires 302 may move freely back and forth through the guide housing 400. The battery wires 302 are discontiguous and protrude from either end of the guide housing 400. At one end of an electrical wire 302, one of a first connector 304 or a second connector 306 is attached that is adapted to mate with a connector on the battery. At the other end of the wire a third connector 308 is attached that is adapted to mate with a receiver on a printed circuit board (PCB) that contains the electrical circuits of the UPS.

Figure 4:
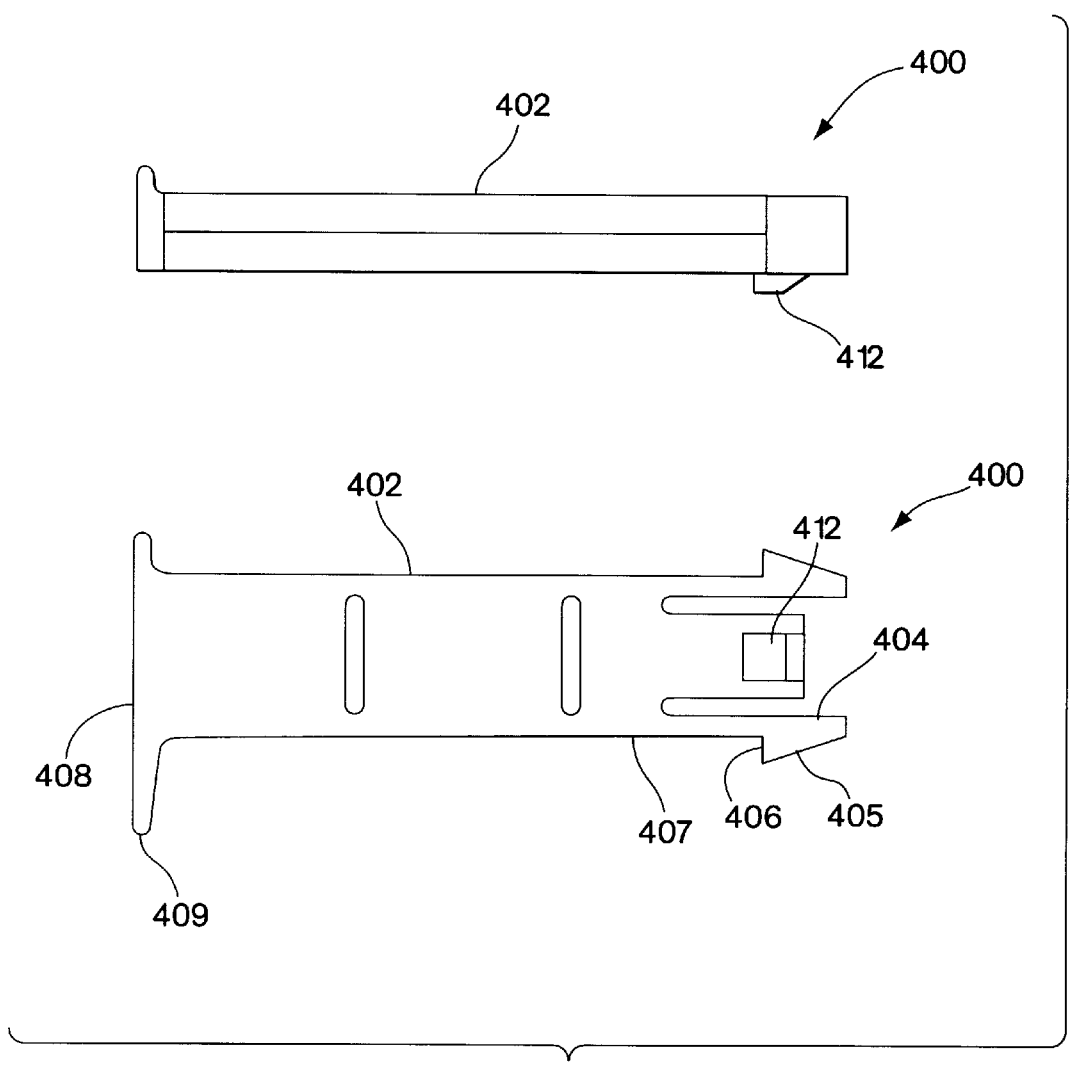
FIGS. 4A and 4B show additional views of the guide housing of FIG. 2.

Guide housing 400, which will now be described with reference to FIGS. 4A and 4B, has an elongated body 402 having a cavity that extends longitudinally and opens at each end of guide housing 400. The illustrated guide housing 400 has a rectangular shape, however in other embodiments, the guide housing 400 may have one of a number of other various shapes such as a tubular shape. The guide housing 400 may be formed using various materials such as metal or plastic, such as poly-vinyl chloride (PVC). At one end, guide-housing 400 includes two latches 404 that protrude from the body 402 of guide housing 400. Each latch 404 is attached to one end of a resilient prong 407 that has its other end attached to the body 402 of guide housing 400, but is otherwise detached. In other embodiments, the latches 404 may be directly attached to the body 402 of guide housing 400. The other end of guide housing 400 protrudes outwardly to form a stopper 408. A portion of the stopper 408 is also formed to be used as a handle 409. The guide housing 400 may be a single piece in which battery wires may be inserted through the cavity or the guide housing 400 may be multiple pieces that are assembled together and/or include snaplocks that lock over the battery wires. Otherwise, the guide housing 400 may be molded or glued onto the battery wires or the guide housing 400 may be ultrasonic welded onto the battery wires.

Referring to FIG. 2, FIG. 3 and FIGS. 4A and 4B, the guide housing 400 is inserted into the tunnel 204 of the chassis 200 with latches 404 entering first. The sloped side 405 of the latch 404 assists the prong 407 in bending inward towards the body of guide housing 400 as the guide housing 400 enters and travels through a first end of the tunnel 204. As the guide housing 400 emerges from the other end of the tunnel 204 the prongs 407 snap back to their original position, thereby preventing the guide housing 400 from withdrawing back into the tunnel 204. The stopper 408 at the other end of the guide housing 400 prevents the guide housing 400 from slipping through the first end of the tunnel 204.

The guide housing 400 may reciprocate along the length of its body 402 inside the tunnel. The distance the guide housing 400 may reciprocate in the tunnel 204 is equal to the difference in the length of the body of the guide housing 400 and the length of the tunnel 204. In the illustrative embodiment, the chassis 200 further comprises a channel 206 in which the guide housing 400 may reciprocate. The guide housing 400 includes a protrusion 412 that ride a wall of channel 206 and facilitates in the guide housing 400's movement in the channel 206.

In the illustrated embodiment, the portion of battery wires 302 feeding the PCB or UPS is not strained during insertion or replacement of battery 500. Strain that may be asserted on that portion of wires 302 by a user, for example, when removing the battery 500 is relieved between the guide housing 400 and the portion of the chassis 200 forming the tunnel 204. As the battery 500 is removed, the guide housing 400 travels in the direction of the pull into the tunnel 204 to be stopped by a back end 406 of latch 404 of guide housing 400. Further pull asserted on the battery 500 causes the battery connectors (such as the connectors 506, 508 in FIGS. 4A and 4B) to be disconnected from the first and second connectors 304, 306 of the wire harness assembly 300 separating the battery 500 from the chassis 200. The guide housing 400 also prevents the battery wires 302 that feed the PCB or UPS from leaving the area in which it is contained through the tunnel 204. It may be desirable that the guide housing 400 moves through the tunnel 204 to the extent that a new battery may be connected with first and second connectors 304, 306 of wire harness assembly 300 with ease.

FIG. 5 shows an insertion of battery 500 into a battery compartment with guide housing 400 extending out to receive the battery 500. Although the battery wires 302 that extend from the guide housing 400 may be of any length, in the illustrated embodiment, it is desired that the wires 302 be as short as possible so that at least one of first and second connectors 304, 306 is substantially stiff with respect to the guide housing 400. In one embodiment, the first and second connectors 304, 306 may be part of guide housing 400. In another embodiment the first and second connectors 304, 306 are positioned such that they meet with respective battery connectors 506, 508 on the battery 500 as the battery is being inserted into the battery compartment. In this embodiment, the guide housing 400 is substantially immobilized laterally in the tunnel 204 of chassis 200. In one embodiment, as the battery 500 slides into the battery compartment, at least one of the battery connectors 506, 508 converges on one of first and second connectors 304, 306 of wire harness assembly 300. The connectors meet and further insertion of battery 500 pushes the guide housing 400 into the tunnel 204 until the guide housing 400 is stopped from further entry by stopper 408. Further push asserted on the battery 500 causes at least one of the connectors 506, 508 on the battery 500 and the wires 302 to mate with each other.

Figure 6:
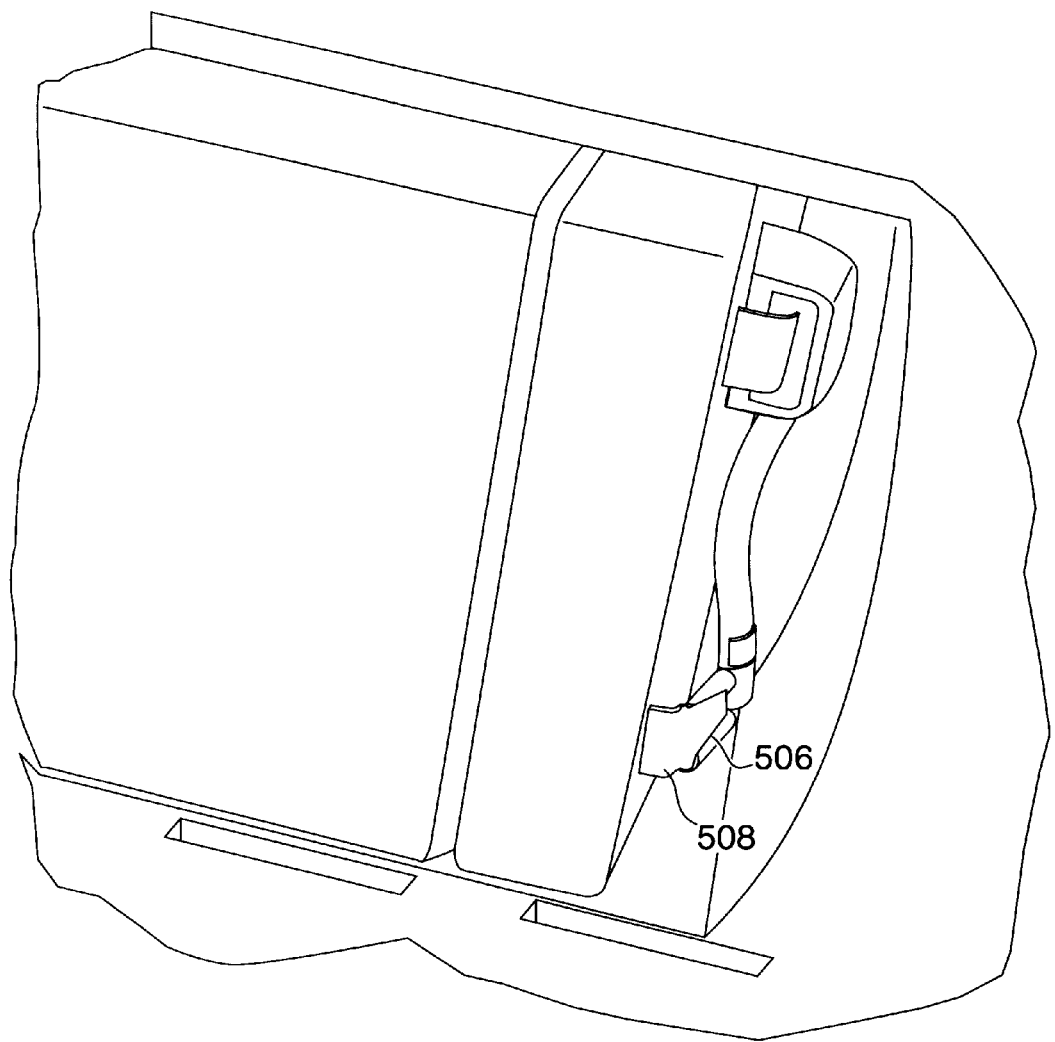
FIG. 6 illustrates the battery of FIG. 5 inserted into the battery compartment with connectors mated.

In another embodiment, the insertion of the battery 500 does not connect the connectors together due to a space that occurs between the battery connectors 506, 508 and the first and second connectors 306, 308 of the wire harness assembly 300. The connectors 304, 306, 506, 508 may be mated together by extracting the guide housing 400 from the tunnel 204 of chassis 200 using handle 409 that is used as a leverage. FIG. 6 shows the battery 500 inserted in the battery compartment with the connectors mated together.

One or more advantages and benefits may be derived from the various embodiments described above. For example, the battery may be installed blindly without concerns of the battery wires being pinched or displaced. The battery may be installed without concerns of the connectors being of wrong polarity. The battery may be shipped inside the battery compartment with the connectors disconnected and accidental connection may be prevented. A handle is provided in which a user may use as a leverage to connect the battery to the wire harness assembly. Strain is relieved on wires connecting the PCB or UPS from the force asserted on the wires by the user. The guide housing prevents the wires from loosely moving around in the chassis. The wire harness assembly allows the battery to be removed simply by pulling the battery out that disconnects the connectors.

While various embodiments of the application have been described, it will be apparent to those of ordinary skill in the art that many more embodiments and implementations are possible within the scope of the invention. Accordingly, the invention is not to be restricted but should be read in light of the attached claims and their equivalents.

What is claimed is:

1. An assembly to provide battery wire lead management in an uninterruptible power supply (UPS) comprising:
   a chassis having a tunnel;
   a wire harness assembly that includes
   a guide housing constructed and arranged to reciprocate in the tunnel, the guide housing having a body with a cavity that opens at each end of the body to receive at least one battery wire; and
   a plurality of battery wires passing through the cavity of the body of the guide housing.

2. The assembly as in claim 1, further comprising at least one latch located at one end of the body.

3. The assembly as in claim 1, further comprising a stopper located at one end of the body.

4. The assembly as in claim 3, wherein a portion of the stopper is formed as a handle.

5. The assembly as in claim 1, wherein:
   the chassis has a channel; and
   the guide housing has at least one protrusion formed on the body of the guide housing to facilitate travel of the guide housing through the channel of the chassis.

6. The assembly as in claim 1, wherein the guide housing is molded onto the wires.

7. The assembly as in claim 1, wherein the guide housing snaplocks over the wires.

8. The assembly as in claim 1, wherein the battery wires are immobile within the guide housing.

9. The assembly as in claim 1, further comprising:
   a first connector attached to one end of a first battery wire of the plurality of battery wires; and
   a second connector attached to one end of a second battery wire of the plurality of battery wires.

10. The assembly as in claim 9, wherein the guide housing includes the first connector and the second connector.

11. The assembly as in claim 9 further comprising:
    a battery connected to the first and second connector.

12. The assembly as in claim 1, wherein the tunnel is adjacent to a battery compartment.

13. An assembly to provide battery wire lead management in a chassis of an uninterruptible power supply (UPS) comprising:
    a wire harness assembly that includes
    a guide housing having a body with a cavity and having a plurality of battery wires passing through the cavity of the body of the guide housing; and
    means for receiving and allowing the guide housing to reciprocate in the chassis.

14. The assembly as in claim 13, further comprising: means for latching the guide housing onto the receiving means.

15. A method for providing a battery wire lead management in an uninterruptible power supply (UPS) having a chassis comprising:
    providing a wire harness assembly that includes
    a guide housing having a body with a cavity that opens at each end of the body to receive at least one battery wire, and
    a plurality of battery wires passing through the cavity of the body of the guide housing; and
    forming a tunnel in the chassis, the tunnel being configured to receive the guide housing and allow the guide housing to reciprocate within the tunnel.

16. The method as in claim 15, further comprising:
    latching the guide housing to the tunnel using at least one latch on one end of the body; and
    forming a stopper at another end of the body of the guide housing.

17. The method as in claim 15, further comprising:
    forming a channel in the chassis; and
    forming at least one protrusion on the body of the guide housing to facilitate the guide housing in traveling through the channel of the chassis.

18. The method as in claim 15, further comprising:
    molding the guide housing onto the battery wires.

19. The method as in claim 15, further comprising:
    providing snaplocks on the guide housing to snaplock the guide housing onto the battery wires.

20. The method as in claim 15, further comprising:
    immobilizing the battery wires within the guide housing.

21. The method as in claim 15, further comprising:
    attaching a first connector to one end of a first battery wire; and
    attaching a second connector to one end of a second battery wire.

22. The method as in claim 21 further comprising:
    connecting a battery to the first and second connectors.

23. The method as in claim 22, further comprising:
    forming a handle on the guide housing that is used as a leverage to connect the battery to at least one of the first and second connectors.

* * * * *